United States Patent [19]

Everhart et al.

[11] Patent Number: 5,534,335
[45] Date of Patent: Jul. 9, 1996

[54] NONWOVEN FABRIC FORMED FROM ALLOY FIBERS

[75] Inventors: Dennis S. Everhart, Alpharetta; Mary L. Delucia, Roswell; Terry K. Timmons, Marietta; Robert D. Wright, Peachtree City, all of Ga.

[73] Assignee: Kimberly-Clark Corporation, Neenah, Wis.

[21] Appl. No.: 320,098

[22] Filed: Oct. 7, 1994

Related U.S. Application Data

[63] Continuation of Ser. No. 125,632, Sep. 23, 1993, abandoned.
[51] Int. Cl.$^6$ .................................................... D03D 3/00
[52] U.S. Cl. ........................... 428/224; 428/296; 428/288; 428/375; 428/373
[58] Field of Search ................................. 428/224, 379, 428/288, 296, 917, 395, 373, 375, 394; 525/931, 935, 941

[56] References Cited

U.S. PATENT DOCUMENTS

| | | | |
|---|---|---|---|
| 3,137,989 | 6/1964 | Fior et al. | 57/140 |
| 3,369,057 | 2/1968 | Twilley | 260/857 |
| 3,546,319 | 12/1970 | Prevorsek et al. | |
| 3,607,509 | 9/1971 | Schrenk | 156/167 |
| 3,645,819 | 2/1972 | Fujii et al. | |
| 3,684,647 | 8/1972 | Matsui et al. | 161/175 |
| 3,841,953 | 10/1974 | Lohkamp et al. | |
| 3,862,287 | 1/1975 | Davis | |
| 3,940,302 | 2/1976 | Matthews et al. | |
| 4,361,609 | 11/1982 | Gerlach et al. | |
| 4,383,084 | 5/1983 | Paschke et al. | |
| 4,424,257 | 1/1984 | Bach | |
| 4,551,378 | 11/1985 | Carey, Jr. | |
| 4,616,064 | 10/1986 | Zukosky et al. | |
| 4,661,132 | 4/1987 | Thornton et al. | |
| 4,667,006 | 5/1987 | Ai et al. | |
| 4,789,592 | 12/1988 | Taniguchi et al. | |
| 4,806,299 | 2/1989 | Burns | |
| 4,812,504 | 3/1989 | Su | |
| 4,822,678 | 4/1989 | Brody et al. | |
| 4,839,228 | 6/1989 | Jezic et al. | 428/401 |
| 4,851,284 | 7/1989 | Yamanoi et al. | |
| 4,851,286 | 7/1989 | Yamauoi et al. | 428/284 |
| 4,861,633 | 8/1989 | Abe | |
| 4,863,795 | 9/1989 | Nakamura et al. | |
| 4,874,666 | 10/1989 | Kubo et al. | 428/401 |
| 4,919,997 | 4/1990 | Twilley et al. | |
| 4,990,550 | 2/1991 | Iwanami et al. | |
| 5,006,601 | 4/1991 | Lutz et al. | |
| 5,078,935 | 1/1992 | Kobayashi et al. | |
| 5,108,276 | 4/1992 | Hartmann | |
| 5,108,827 | 4/1992 | Gessner | |

FOREIGN PATENT DOCUMENTS

| | | |
|---|---|---|
| 0-159-427 | 10/1985 | European Pat. Off. |
| 0-394-954 | 10/1990 | European Pat. Off. |
| 52-085242 | 7/1977 | Japan |
| 55-009661 | 1/1980 | Japan |

OTHER PUBLICATIONS

Multi phrase Polymer: Blends & Ionomers (Polymers). Korean Patent.
Sang Jin Park et al: Engineering Polymer Journal, vol. 26, No. 2(1990) 131–136: Morphological, Thermal and Rheological Properties of The Blends Polypropylene/Nylon-6, Polypropylene/Nylon-6 (Maleic Anhydride-g-Polypropylene) and (Maleic Anhydrids-g- polypropylene/Nylon-6).
Sain et al: Journal of Applied Polymer Science, vol. 44 (1992) 1061–1068: Structure–Property Relationship of Modified Polypropylene–Polycaproamide Fiber.
Grof, Durcova and Marcincin: Acta Polymerica 40 (1989) Nr. 5 344–349: Structure of fibres prepared from polypropylene–polycaproamide mixture. 1.
Durcova, Grof and Marcinin: Acta Polymerica 41 (1990) Nr. 3 164–166: Structure of fibres prepared from polypropylene–polycaproamide mixture. 2.
Grof, M. M. Sain and Olga Durcova: Journal of Applied Polymer Science, vol. 44 (1992) 1061–1068: Structure–Property Relationship of Modified Polypropylene–Polycaproamide Fiber.
Fumio Ide and Akira Hasegawa: Journal of Applied Polymer Science, vol. 18 (1974) 963–974: Studies on Polymer Blend of Nylon 6 and Polypropylene or Nylon 6 and Polystyrene Using the Reaction of Polymer.
G. Serpe, J. Jarrin and F. Dawans: Polymer Engineering and Science, vol. 30, No. 9 (1990) 553–565: Morphology–Processing Relationships in Polyethylene–Polyamide Blends.
Gary R. Fairley and Robert E. Prud'homme: American Chemical Society (1989) 212–228: Multiphase Polymers: Blends and Ionomers: Rheology of Polyethylene—Ionomer Blends.
R. X. Yu, Y. P. Zhu and M. Lambla: ANTEC (1991) 1051–1058: Studies of Co–Crystalline Structure and Properties of PA/PP Blends.
San Jin Park, Byung Kyu Kim and Han Mo Jeong: Engineering Polymer Journal, vol. 26, No. 2 (1990) 131–136: Morphological, Thermal and Rheological Properties of the Blends Polypropylene/Nylon-6, Polypropylene/Nylon-6/ (Maleic Anhydride–g–Polypropylene) and (Maleic Anhydride–g–Polypropylene)/Nylon-6.

Primary Examiner—Patrick J. Ryan
Assistant Examiner—Merrick Dixon
Attorney, Agent, or Firm—James B. Robinson

[57] ABSTRACT

A nonwoven fabric is provided which is made from fibers comprising at least two thermoplastic polymers and a compatibilizer. One of the thermoplastic polymers is present as a dominant continuous phase and the other one or more polymers are present as a non-continuous phase or phases. The polymer of the non-continuous phase or phases has a polymer melt temperature less than 30° C. below the polymer melt temperature of the continuous phase. The polymer of the dominant phase may be, for example, polypropylene and the non-continuous phase may be, for example, polyamide. The compatibilizer may be one of several such as zinc ionomers of ethylenemethacrylic acid or modified polypropylene with maleic anhydride. The fibers from which the fabric is made are generally between about 5 and 50 microns in diameter and the non-continuous phase may exist within the continuous phase as fibrils with a cross-sectional area at least 0.1% of the cross-sectional area of the fiber.

16 Claims, No Drawings

NONWOVEN FABRIC FORMED FROM ALLOY FIBERS

This application is a continuation of application Ser. No. 08/125,632 now abandoned entitled NONWOVEN FABRIC FORMED FROM ALLOY FIBERS which was filed in the U.S. Patent and Trademark Office on Sep. 23, 1993.

BACKGROUND OF THE INVENTION

Thermoplastic resins have been extruded to form fibers and webs for a number of years. The common thermoplastics for this application are polyolefins, particularly polypropylene, and polyesters. Each material has its characteristic advantages and disadvantages visa vis the properties desired in the final product to be made from such fibers.

Blends and alloys of two or more polymers are areas of some interest because of a desire to combine the desirable properties of such polymers. Dr. Leszek A Utracki, in his work "Polymer Alloys and Blends: Thermodynamics and Rheology" (ISBN 0-19-520796-3, Oxford University Press, New York, N.Y., 1989) discusses the history of development in this area at some length.

There remains a need for a fabric produced from fibers of an alloy of polymers wherein the polymer melt temperature of the non-continuous phase is not at least 30° C. below that of the continuous phase (and may even be higher) and in which desired characteristics are enhanced.

DEFINITIONS

As used herein the term "nonwoven fabric or web" means a sheet materially having a structure of individual fibers or threads which are interlaid, but not in a regular manner such as occurs with knitting or weaving processes. Nonwoven fabrics or webs have been formed from many processes such as for example, meltblowing processes, spunbonding processes, and bonded carded web processes.

As used herein the term "microfibers" means small diameter fibers having an average diameter not greater than about 100 microns, for example, having an average diameter of from about 0.5 microns to about 50 microns, or more particularly, microfibers may have an average diameter of from about 2 microns to about 40 microns.

As used herein the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameter, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Buntin.

As used herein the term "spunbonded fibers" refers to small diameter fibers which are formed by extruding molten thermoplastic material as filaments from a plurality of fine, usually circular capillaries of a spinnerette with the diameter of the extruded filaments then being rapidly reduced as by, for example, the process described in U.S. Pat. No. 4,340,563 to Appel et al., and U.S. Pat. No. 3,692,618 to Dorschner et al.

As used herein the term "bicomponent" refers to fibers which have been formed from at least two polymers extruded from separate extruders but spun together to form one fiber. The polymers are arranged in substantially distinct zones across the cross-section of the bicomponent fibers and extend continuously along the length of the bicomponent fibers. The configuration of such a bicomponent fiber may be a sheath/core arrangement wherein one polymer is surrounded by another or may be a side by side arrangement.

As used herein the term "polymer" generally includes but is not limited to, homopolymers, copolymers, such as for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to isotactic, syndiotactic and random symmetries.

The term "biconstituent fibers" refers to fibers which have been formed from at least two polymers extruded from the same extruder as a blend. The term "blend" is defined below. Biconstituent fibers do not have the various polymer components arranged in distinct zones across the cross-sectional area of the fiber and the various polymers are usually not continuous along the entire length of the fiber, instead usually forming fibrils which start and end at random. Biconstituent fibers are sometimes also referred to as multiconstituent fibers. Fibers of this general type are discussed in, for example, U.S. Pat. No. 5,108,827 to Gessner. Bicomponent and biconstituent fibers are also discussed in the textbook *Polymer Blends and Composites* by John A. Manson and Leslie H. Sperling, copyright 1976 by Plenum Press, a division of Plenum Publishing Corporation of New York, IBSN 0-306-30831-2, at pages 273 through 277.

As used herein the term "blend" means a mixture of two or more polymers while the term "alloy" means a sub-class of blends wherein the components are immiscible but have been compatibilized. "Miscibility" and "immiscibility" are defined as blends having negative and positive values, respectively, for the free energy of mixing. "Compatibilization" is defined as the process of modifying the interfacial properties of an immiscible polymer blend in order to make an alloy.

As used herein, the term "bonding window" means the range of temperature of the calender rolls used to bond the nonwoven fabric together, over which such bonding is successful. Calendering generally uses two roller, an upper or pattern roller and a lower or anvil roller. Such rolls are usually held at slightly different temperatures, therefore, all references to the calender temperature and bonding window herein shall mean the temperature of the upper or pattern roller. For polypropylene, the bonding window is typically from about 270° to about 310° F. (132° to 154° C.). Below about 270° F. the polypropylene is not hot enough to melt and bond and above about 310° F. the polypropylene will melt excessively and can stick to the calender rolls. Polyethylene has an even narrower bonding window, typically from about 250° F. to about 258° F. (121° to 125.6° C.).

SUMMARY OF THE INVENTION

A nonwoven fabric is provided which is made from fibers comprising at least two thermoplastic polymers and a compatibilizer. One of the thermoplastic polymers is present as a dominant continuous phase and the other one or more polymers are present as a non-continuous phase or phases. The polymer of the non-continuous phase or phases has a polymer melt temperature less than 30° C. below the polymer melt temperature of the continuous phase. The polymer of the non-continuous phase or phases may even have a polymer melt temperature greater than the polymer melt temperature of the continuous phase.

DETAILED DESCRIPTION OF THE INVENTION

The nonwoven fabrics of this invention may be made from multiconstituent fibers which are an alloy of at least two immiscible polymers which have been compatibilized through the use of a suitable compatibilizer. In other words if, for example, the continuous phase polymer melt temperature were 300° C., a suitable non-continuous phase polymer could have a melt temperature of slightly more than 270° C. to more than 300° C.

The alloy of polymers used to make the fibers used in the fabric of this invention is such that the polymer melt temperature of the non-continuous phase is in the range of from less than 30° C. below to any value greater than that of the continuous phase.

Suitable polymer mixtures which may be used in the practice of this invention include, for example, polyolefins and polyamides, and polyolefins and polyesters.

The polyolefin which may be used in the practice of this invention may be amorphous or crystalline, atactic, isotactic or sydiotactic. Suitable polyolefins include polyethylene, polypropylene, polybutylenes and copolymers, blends and mixtures thereof and are available commercially from a number of suppliers. The particular properties of polyolefins used in the spunbonding and meltblowing processes are known to those skilled in the art.

The polyamide which may be used in the practice of this invention may be any polyamide known to those skilled in the art including copolymers and mixtures thereof. Examples of polyamides and their methods of synthesis may be found in "Polymer Resins" by Don E. Floyd (Library of Congress Catalog number 66–20811, Reinhold Publishing, New York, 1966). Particularly commercially useful polyamides are nylon-6, nylon 6,6, nylon-11 and nylon-12. These polyamides are available from a number of sources such as Emser Industries of Sumter, S.C. (Grilon® & Grilamid® nylons) and Atochem Inc. Polymers Division, of Glen Rock, N.J. (Rilsan® nylons), among others.

Modifying the interfacial properties of the immiscible polymer blend to make an alloy is accomplished through the use of a compatibilizer. It is believed, though applicants do not wish to be bound by any particular theory, that a compatibilizer has polar and non-polar parts and the polar part reacts with or is attracted to a polar part of one of the polymers to be alloyed. The non-polar part of the compatibilizer remains available for reaction with or attraction to the dominant phase polymer and this results in more intimate mixing. The reduction in the interfacial energy caused by the compatibilizer allows the size of the discontinuous phase to be reduced within the continuous phase.

Any compatibilizer known to those skilled in the art to enhance the blending of polymers may be used. An example of such compatibilizers are polypropylenes modified with maleic acid/anhydride. Another useful compatibilizer has the general formula:

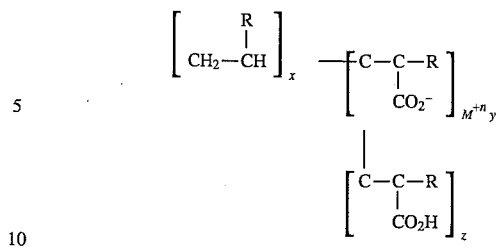

wherein each R may independently be H or an alkyl group, $M^+$ is an alkali, alkaline earth or transition metal cation, and n, x, y and z are integers. A particularly useful class of this compatibilizer is poly(olefin-methacrylic acid) where the acid groups are partially or fully neutralized by metal ions.

Commercial examples of compatibilizers useful in this invention include Exxelor® polymer modifier PO1015 or VA1803 available from Exxon Chemical Company, and the family of Surlyn® ionomers available from E.I. Dupont de Nemours Inc., particularly Surlyn® 9020 ionomer.

Exxelor® polymer modifier PO1015 is a proprietary chemical which has a melt flow rate of 120 g/10 min., a density of 0.91 g/cm3 and has 0.4 weight percent of grafted maleic acid/anhydride. Exxelor® polymer modifier VA1803 has a melt flow rate of 3 g/10 min., a density of 0.86 g/cm3 and has 0.7 weight percent of maleic acid/anhydride. Surlyn® 9020 ionomer has a melt flow rate of 1.0 g/10 min. and a density of 0.96 g/cm3. The Surlyn® ionomer resins are based on ethylene and methacrylic acid di- and ter-polymers which have been partially reacted with metallic salts (generally zinc or sodium) to form ionic crosslinks between the acid groups within a chain or between neighboring chains.

The fibers of this invention may also have, in addition to the compatibilized blend of polymers, other polymers present in a structure which is known as a bicomponent. This structure may be a sheath/core or side by side orientation.

The fibers from which the fabric of this invention is made may be produced by the meltblowing or spunbonding processes which are well known in the art. These processes generally use an extruder to supply melted polymer to a spinnerette where the polymer is fiberized. The fibers are then drawn, usually pneumatically, and deposited on a foraminous mat or belt to form the nonwoven fabric. The fibers produced in the spunbond and meltblown processes are generally in the range of from about 1 to about 50 microns in diameter, depending on process conditions and the desired end use for the fabrics to be produced from such fibers.

It has been found that the fibers used to make the fabric of this invention have the polymer of the non-continuous phase or phases substantially evenly distributed throughout the continuous phase as opposed to, for example, being preferentially deposited on the surface of the fiber. It has also been found that the non-continuous phase exhibits a fibrillar structure inside the continuous phase and that the single polymer domain non-continuous phase or phases have a cross-sectional area of at least 0.1% of the cross-sectional area of the fiber.

The fabric of this invention may be used in a single layer embodiment or as a component of a multilayer laminate which may be formed by a number of different laminating techniques including but not limited to using adhesive, needle punching, thermal calendering and any other method known in the art. Such a multilayer laminate may be an embodiment wherein some of the layers are spunbond and some meltblown such as a spunbond/meltblown/spunbond (SMS) laminate as disclosed in U.S. Pat. No. 4,041,203 to Brock et al. and U.S. Pat. No. 5,169,706 to Collier, et al. Such a laminate may be made by sequentially depositing onto a moving forming belt first a spunbond fabric layer, then a meltblown fabric layer and last another spunbond layer and then bonding the laminate in a manner described above. Alternatively, the three fabric layers may be made individually, collected in rolls, and combined in a separate bonding step. Some or all of such SMS layers may be made from the fabric of this invention. The fabric of this invention may also be laminated with films, glass fibers, staple fibers, paper, and other web materials.

The following examples illustrate particular embodiments of the invention.

EXAMPLE 1

The polymer alloys were generally produced by compounding the ingredients in a 30 or 60 mm twin screw extruder and which was performed by a vendor. Any other method known to those skilled in the art of compounding polymers as effective may also be used.

The alloys for this example were made with each of two polyamides, nylon 6 and 12, with polyolefin and Surlyn® 9020 ionomer. The polyolefin used was Exxon Chemical Company's PD 3445 polypropylene which has a melt flow rate of 35 g/10 min. The polyamides used in these examples were polyamide 6 sold as Grilon® A23 nylon 6 by Emser Industries, having a melting point of 230° C. (ASTM D792) and a specific gravity of 1.14 (ASTM D792), polyamide 11 sold as Rilsan® nylon 11 by Atochem Inc., having a melting point of 186° C. and a specific gravity of 1.03, and polyamide 12 sold as Rilsan® nylon 12 by Atochem Inc. with a melting point of 174° C. and a specific gravity of 1.02.

The amounts in the initial blends were 4.5 weight percent polyamide, 0.5 weight compatibilizer and the balance polypropylene. Some blends were further diluted through the addition of polypropylene and are indicated in the table, i.e. the example in table 1 of polyamide 6 at 205° F. indicates that the initial mixture was diluted by 50% with polypropylene to yield a mixture with 2.25% polyamide, 0.25% compatibilizer and the balance polypropylene. The dilution was accomplished by thoroughly mixing pellets of polypropylene with pellets of the blend at room temperature.

The two alloys were melt spun through a standard 600 hole round pack with a pin density of 50 to 85 holes per inch (hpi), a length to exit diameter (L/D) of 6 and a 0.6 mm exit diameter. The extruder and pack temperatures were between 430° F. (221° C.) and 460° F. (238° C.) and throughput was typically 0.7 grams/hole/min (ghm). The extruded fibers were thermally point bonded by calendering using an Expanded Hansen Penning bond roll with a 15% bond area to create a fabric with integrity at a calender temperature of 285° F. (140.6° C.) as indicated in table 1. The fibers which were calendered at 205° F. (96.1° C.) as indicated in table 1 used a 714 bond pattern with a 15% bond area. Mechanical data for 1 ounce per square yard (osy) spunbond fabrics made from these alloy fibers is shown in table 1 in relation to fabric made from fibers of polypropylene alone, and compares well.

TABLE 1

| | (Surlyn ® 9020 ionomer) | | | |
| --- | --- | --- | --- | --- |
| | Temperature (°F.) | load (lb) | Energy (in-lb) | Elongation % |
| Polypropylene | 285 | 17 | 17 | 57 |
| Polyamide 6 | 285 | 6 | 13 | 99 |
| Polyamide 12 | 285 | 12 | 31 | 125 |
| Polypropylene | 205 | 1 | 1 | 23 |
| Polyamide 6 (2.25%) | 205 | 4 | 8 | 71 |
| Polyamide 12 | 205 | 8 | 22 | 128 |

EXAMPLE 2

Compounded alloys were made as in example 1 with each of three polyamides, nylon 6, nylon 11 and nylon 12 with polyolefin and Exxelor® polymer modifier PO1015. The polyolefin used was Exxon PD 3445 polypropylene.

The amounts in the initial blends were 4.5 weight percent polyamide, 0.5 weight compatibilizer and the balance polypropylene. Some blends were further diluted through the addition of polypropylene and are indicated in the table, i.e. the example in table 2 of polyamide 6 at 285° F. indicates that the initial mixture was diluted by 50% with polypropylene to yield a mixture with 2.25% polyamide, 0.25% compatibilizer and the balance polypropylene. The dilution was accomplished by thoroughly mixing pellets of polypropylene with pellets of the blend at room temperature.

The alloys were melt spun into fibers and bonded under conditions and with equipment similar to those of example 1. The calender had an Expanded Hansen Penning bond roll with a 15% bond area except for the polyamide 11 fabric which used a wire weave bond roll with a 15% bond area and the fabric calendered at 205° F. which used a 714 bond pattern with a 15% bond area. Bonding temperatures are shown in table 2 along with the mechanical data for 1 osy spunbond fabrics made from these alloy fibers, in relation to fabric made from fiber of polypropylene alone.

TABLE 2

| | (Exxelor ® polymer modifier PO1015) | | | |
| --- | --- | --- | --- | --- |
| | Temperature (°F.) | load (lb) | Energy (in-lb) | Elongation % |
| Polypropylene | 285 | 17 | 17 | 57 |
| Polyamide 6 (2.25%) | 285 | 16 | 24 | 83 |
| Polypropylene | 205 | 1 | 1 | 23 |

TABLE 2-continued

| | (Exxelor ® polymer modifier PO1015) | | | |
|---|---|---|---|---|
| | Temperature (°F.) | load (lb) | Energy (in-lb) | Elongation % |
| Polyamide 11 (2.25%) | 208 | 3 | 3 | 178 |
| Polyamide 11 | 208 | 2 | 4 | 108 |
| Polyamide 12 | 205 | 5 | 8 | 75 |

EXAMPLE 3

Compounded mixtures were made as in example 1 with each of three polyamides, nylon 6, nylon 11 and nylon 12 with polyolefin and Exxelor® polymer modifier VA1803. The polyolefin used was Exxon PD 3445 polypropylene.

The amounts in the initial blends were 4.5 weight percent polyamide, 0.5 weight compatibilizer and the balance polypropylene. Some blends were further diluted through the addition of polypropylene and are indicated in the table, i.e. the example in table 3 of polyamide 11 at 208° F. (97.8° C.) indicates that the initial mixture was diluted by 50% with polypropylene to yield a mixture with 2.25% polyamide, 0.25% compatibilizer and the balance polypropylene, the example in table 3 of polyamide 12 at 285° F. indicates that the initial mixture was diluted by 50% with polypropylene to yield a mixture with 2.25% polyamide, 0.25% compatibilizer and the balance polypropylene. The polyamide 12 was mixed with about 0.9% polyamide, 0.1% compatibilizer and the balance polypropylene.

The alloys were melt spun into fibers and bonded under conditions and with equipment similar to those of example 1. The calender had an Expanded Hansen Penning bond roll with a 15% bond area except for the polyamide 12 at 285° F. and polyamide 11 fabric which used a wire weave bond roll with a 15% bond area and the fabrics bonded at 205° F. which used a 714 bond pattern with 15% bond area. Bonding temperatures were 285° F. (140.6° C.), 205° F. (96° C.) and 208° F. (97.8° C.) and are shown in table 3 along with the mechanical data for the 1 osy spunbond fabrics made from these alloy fibers, in relation to fabric made from fibers of polypropylene alone.

The amounts in the initial blends were 0.9 weight percent polyamide, 0.1 weight percent compatibilizer and the balance polyethylene. The final blend had 4.5% polyamide, 0.5% compatibilizer and the balance polypropylene.

The alloys were melt spun into fibers and bonded under conditions and with equipment similar to those of example 1. The calender had a wire weave bond roll with a 15% bond area. Bonding temperatures were 253° F. (122.8° C.) and 230° C. (110° C.) and are shown in table 4 along with the mechanical data for the approximately 1 osy spunbond fabrics made from these alloy fibers, in relation to fabric made from fibers of polyethylene alone.

TABLE 3

| | (Exxelor ® polymer modifier VA1803) | | | |
|---|---|---|---|---|
| | Temperature (°F.) | load (lb) | Energy (in-lb) | Elongation % |
| Polypropylene | 285 | 17 | 17 | 57 |
| Polyamide 6 | 285 | 12 | 21 | 97 |
| Polyamide 12 (0.9%) | 285 | 16 | 23 | 80 |
| Polypropylene | 205 | 1 | 1 | 23 |
| Polyamide 6 | 205 | 2 | 2 | 49 |
| Polyamide 11 (2.25%) | 208 | 2 | 6 | 160 |
| Polyamide 11 | 208 | 1 | 1 | 40 |
| Polyamide 12 (0.9%) | 205 | 7 | 10 | 70 |

EXAMPLE 4

Compounded mixtures were made as in example 1 with polyamide nylon 6, polyolefin and Surlyn® polymer modifier 9020. The polyolefin used was Dow Aspun® 6811A polyethylene with a melt flow index at 190° C. of 22 grams/10 minutes.

TABLE 4

| | (Surlyn ® ionomer) | | | |
|---|---|---|---|---|
| | Temperature (°F.) | load (lb) | Energy (in-lb) | Elongation % |
| Polyethylene | 253 | 4.3 | 7.8 | 87 |
| Polyethylene | 253 | 4.3 | 8.1 | 98 |
| Polyethylene | 253 | 5.3 | 10.3 | 94 |
| Polyethylene | 253 | 5.1 | 10.1 | 104 |
| Polyethylene | 253 | 4.2 | 9.0 | 106 |
| Polyethylene | 253 | 4.4 | 8.3 | 100 |
| Polyethylene | 230 | 3.6 | 3.7 | 57 |
| Polyamide 6 | 230 | 1.9 | 3.3 | 83 |
| Polyamide 6 | 230 | 2.1 | 3.7 | 87 |
| Polyamide 6 | 230 | 1.5 | 2.7 | 76 |
| Polyamide 6 | 230 | 1.5 | 2.4 | 78 |
| Polyamide 6 (4.5%) | 230 | 2.5 | 2.3 | 50 |

The test method for tensile strength and elongation that was used in the examples is called the grab method. This test is known in the art and conforms to the specifications of Method 5100 of the Federal Test Methods Standard No. 191A. The results are expressed in pounds to break and percent stretch before breakage. Higher numbers indicate a stronger, more stretchable fabric. The term "load" means the maximum load or force, expressed in units of weight, required to break or rupture the specimen in a tensile test. The term "energy" means the total energy under a load versus elongation curve as expressed in weight-length units. The term "elongation" means the increase in length of a specimen during a tensile test.

The results of the tests at conventional bonding temperatures (285° F.) indicate that fabric made from fibers of alloys of polypropylene, polyamide and compatibilizer give results for load and energy which are comparable to or better than fabric made from fibers of polypropylene alone while the elongation for the alloy fabric is far greater than that of the polypropylene fabric.

The lower bonding temperature (205° F.) results indicate that the bonding window has been enhanced or widened. Polypropylene is bonded at a temperature of typically from about 270 ° to 310° F. (132° to 154.4° C.). Bonding at lower temperatures provides energy savings and allows greater ease of processing and controllability. Bonding at temperatures in the range of 200° to 325° F. (93° to 163° C.) is believed possible.

The results for the polyethylene/polyamide compatibilized blends, while not an improvement over polyethylene alone for the properties measured, indicate that compatibilization, spinning and bonding of these immiscible components is indeed possible. As was the case with polypropylene, the bonding window for the polyethylene/polyamide alloy is also considerably larger than for polyethylene alone.

One example of a use of a multilayer laminate incorporating the fabric of this invention is as a sterilization wrap which is used to enclose an object to be sterilized and which allows sterilization to occur but thereafter acts as to impede the re-contamination of the object. The properties of such a wrap are discussed in U.S. Pat. No. 4,041,203 and include the ability to permit penetration of a sterilent such as ethylene oxide at about 130° F. (54.4° C.), steam at about 250°–280° F. (121°–138° C.), gamma radiation, etc., and to thereafter impede to a high degree the passage of bacteria and like contaminants. The sterilization process is quite stressful and it is important that fabrics exposed to the sterilization process retain strength sufficient to function for the desired purpose.

EXAMPLE 5

Fabric made from fibers made according to this invention of, by weight, 95% polypropylene, 4.5% polyamide 6 or 12 and 0.5 % Surlyn 9020 compatibilizer, control fabrics of 100% polypropylene, and fabrics of fibers having 97% polypropylene, 2.5% polyamide 6 and 0.5% Surlyn 9020 compatibilizer were tested as described above, before and after steam sterilization.

Steam sterilization was accomplished using an AMSCO general purpose sterilizer produced by AMSCO Industrial Co., a division of American Sterilizer Co., of Erie, PA with a Partlow MIC-6000 microprocessor. The sterilization process is a five step vacuum procedure. In step one the fabric is subjected to a vacuum of 10 inches of mercury (inHg) (500 mmHg absolute pressure). In step two steam is introduced to warm the fabric in order to avoid condensation upon saturation with steam. In step three the fabric is subjected to a vacuum of 18 inHg (300 mmHg absolute pressure). In step four the fabric is subjected to 100% steam saturation at 275° F. (135° C.) for 4 minutes. Step five is a drying step in which the steam flow is stopped and the fabric is subjected to a vacuum of 26 inHg (100 mmHg absolute pressure) for 20 minutes and cooled to about 200° F. (93° C.).

The results are provided in table 5 with the 2.5% polyamide 6 fabric listed last. Results shown are machine direction test data.

TABLE 5

| | (Surlyn ® 9020 ionomer) | | | |
|---|---|---|---|---|
| | Sterilized | load (lb) | Energy (in-lb) | Elongation % |
| Polypropylene | no | 16.8 | 17.2 | 56 |
| Polypropylene | yes | 11.2 | 6.2 | 31.8 |
| Polypropylene | no | 15.7 | 14.4 | 52.4 |
| Polypropylene | yes | 10.6 | 5.5 | 31.3 |
| Polyamide 12 | no | 12.4 | 30.2 | 117 |
| Polyamide 12 | yes | 11.5 | 13.5 | 61 |
| Polyamide 6 | no | 7.3 | 15.5 | 99 |
| Polyamide 6 | yes | 6 | 6.3 | 49.7 |
| Polyamide 6 | no | 11.6 | 18.7 | 88.1 |
| Polyamide 6 | yes | 7.7 | 5.3 | 40.1 |
| Polyamide 6 | no | 14.3 | 18.5 | 68.1 |
| Polyamide 6 | yes | 10.1 | 6.8 | 39.5 |

The fabric using polyamide 12 has about twice the post-sterilization energy and elongation values as a sterilized fabric of 100% polypropylene fibers. Peak load for the alloy fiber fabric is apparently little affected by sterilization.

We claim:

1. A nonwoven fabric comprising multiconstituent alloy fibers composed of at least two thermoplastic polymers and a compatibilizer, wherein one of said thermoplastic polymers has a polymer melt temperature and forms a dominant continuous phase, and the other one or more polymers form a non-continuous phase or phases wherein the polymer of said non-continuous phase or phases has a polymer melt temperature less than 30° C. below the polymer melt temperature of said continuous phase.

2. The nonwoven fabric of claim 1 which is made from fibers having cross-sectional areas wherein any single polymer domain cross-section of said non-continuous phase or phases is at least 0.1% of the cross-sectional area of said fiber.

3. The nonwoven fabric of claim 1 which is made from fibers wherein said continuous phase is at least one polyolefin and said non-continuous phase is at least one polyamide.

4. The nonwoven fabric of claim 1 which is made from fibers wherein the non-continuous phase or phases are substantially evenly distributed throughout said fiber.

5. The nonwoven fabric of claim 1 which is made from fibers wherein the fibers have diameters of approximately 1 to 50 microns.

6. The nonwoven fabric of claim 1 which is made from fibers wherein the compatibilizer is selected from the group consisting of polypropylenes modified with maleic anhydride and those having a formula:

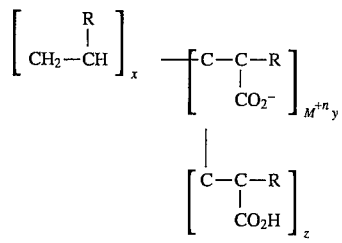

wherein each R may independently be H or an alkyl group, $M^+$ is selected from the group consisting of alkali, alkaline earth and transition metal cations, and n, x, y and z are integers.

7. The nonwoven fabric of claim 6 which is made from fibers wherein the compatibilizer is a zinc ionomer of poly(ethylene-methacrylic) acid.

8. The nonwoven fabric of claim 1 which is made from fibers which have been thermally bonded at a temperature between about 93° and about 163° C.

9. The nonwoven fabric of claim 1 which has a percent elongation of at least 50% greater than that of nonwoven fabric made from polypropylene fibers which have been bonded at a similar temperature.

10. The nonwoven fabric of claim 1 which is made by the process selected from the group consisting of spunbonding and meltblowing.

11. The nonwoven fabric of claim 3 which is made from fibers wherein the polyamides are selected from the group consisting of polyamide 6, polyamide 11, polyamide 12, and copolymers, blends and mixtures thereof.

12. The nonwoven fabric of claim 3 which is made from fibers wherein said polyolefin is selected from the group consisting of polyethylene, polypropylene, polybutylenes and copolymers, blends and mixtures thereof, and is present in an amount between approximately 50 to 99.9 weight percent, said polyamide is present in an amount between approximately 0.1 to 30 weight percent and said compatibilizer is present in amount between approximately 0.01 and 20 weight percent.

13. A nonwoven fabric sterilization wrap comprised of a plurality of layers wherein at least one of said layers is comprised of the fabric of claim 1.

14. A nonwoven fabric which is made from multiconstituent alloy fibers comprising at least two thermoplastic polymers and a compatibilizer, wherein one of said thermoplastic polymers is polypropylene as a dominant continuous phase present in an amount between approximately 50 to 99.9 weight percent, and the other one or more polymers are polyamides as a non-continuous phase or phases present in an amount between approximately 0.1 to 30 weight percent, and said compatibilizer is a zinc ionomer of ethylenemethacrylic acid present in amount between approximately 0.01 and 20 weight percent, and wherein the polymer of said non-continuous phase or phases has a polymer melt temperature less than 30° C. below the polymer melt temperature of said continuous phase.

15. A nonwoven fabric which is made from multiconstituent alloy fibers comprising polypropylene present in an amount of approximately 99 weight percent, polyamide 12 present in an amount of approximately 0.9 weight percent and a compatibilizer which has a melt flow rate of about 120 g/10 min., a density of about 0.9 g/cm3 and has about 0.4 weight percent of grafted maleic acid/anhydride and is present in amount of approximately 0.1 weight percent, and wherein said fibers have been thermally bonded at a temperature below 140.6° C., and wherein the polymer of said non-continuous phase or phases has a polymer melt temperature less than 30° C. below the polymer melt temperature of said continuous phase.

16. A nonwoven fabric comprising bicomponent fibers formed from at least two polymers extruded from separate extruders wherein one of said extruders supplies a multiconstituent blend of at least two thermoplastic alloy polymers and a compatibilizer, in which one of said alloy polymers has a polymer melt temperature and forms a dominant continuous phase, and the other alloy polymer or polymers form a non-continuous phase or phases wherein the polymer of said non-continuous phase or phases has a polymer melt temperature less than 30° C. below the polymer melt temperature of said continuous phase.

* * * * *

UNITED STATES PATENT AND TRADEMARK OFFICE
CERTIFICATION OF CORRECTION

PATENT NO. : 5,534,335

DATED : July 9, 1996

INVENTOR(S) : Everhart, et al.

It is certified that the following errors appear in the above-identified patent and that said Letters Patent is hereby corrected as shown below:

Column 1, line 15, "visa" should read --vis a--;
Title page, item [56], Other Publications, Line 37, "San" should read --Sang--.
Title page, item [56], insert:

| | | | |
|---|---|---|---|
| 3,692,618 | 9/1972 | Dorschner et al | 161/072 |
| 3,849,241 | 11/1974 | Buntin et al | 161/169 |
| 4,041,203 | 8/1977 | Brock et al | 428/157 |
| 4,340,563 | 7/1982 | Appel et al | 264/518 |
| 5,169,706 | 12/1992 | Collier, IV et al | 428/152 |

Title page, item [56], insert:
Polyamide Resins by Don Floyd, 1966, Reinhold Publishing, N.Y., N.Y.
Polymer Alloys & Blends Thermodynamics and Rheology by Dr. Leszek
  Utracki, 1989: Oxford University: Press, N.Y., N.Y.
Polymer Blends & Composites by : John A. Manson & Leslie H. Sperling;
  1976 -- Plenum Press; New York & London Pages 273-276.

Signed and Sealed this

Twenty-ninth Day of October 1996

Attest:

BRUCE LEHMAN

*Attesting Officer*    *Commissioner of Patents and Trademarks*